United States Patent
Veenma

(10) Patent No.: US 11,416,195 B2
(45) Date of Patent: Aug. 16, 2022

(54) PRINTING PRODUCT INFORMATION ON A SUBSTRATE BASED ON PACKAGE AND SERIAL INFORMATION

(71) Applicant: Dover Europe Sàrl, Vernier (CH)

(72) Inventor: Roger Veenma, Barcelona (ES)

(73) Assignee: Dover Europe Sàrl, Vernier (CH)

( * ) Notice: Subject to any disclaimer, the term of this patent is extended or adjusted under 35 U.S.C. 154(b) by 60 days.

(21) Appl. No.: 17/055,568

(22) PCT Filed: May 21, 2019

(86) PCT No.: PCT/EP2019/063133
§ 371 (c)(1),
(2) Date: Nov. 14, 2020

(87) PCT Pub. No.: WO2019/224208
PCT Pub. Date: Nov. 28, 2019

(65) Prior Publication Data
US 2021/0117139 A1    Apr. 22, 2021

(30) Foreign Application Priority Data
May 21, 2018  (EP) .................................... 18173433

(51) Int. Cl.
G06F 3/12        (2006.01)
G06K 19/06    (2006.01)
G06K 19/07    (2006.01)

(52) U.S. Cl.
CPC .......... *G06F 3/1243* (2013.01); *G06F 3/1208* (2013.01); *G06F 3/1215* (2013.01);
(Continued)

(58) Field of Classification Search
None
See application file for complete search history.

(56) References Cited

U.S. PATENT DOCUMENTS

2011/0112685 A1    5/2011  Clark
2017/0083731 A1*  3/2017  Sanwald .............. G07D 7/0047
2018/0124273 A1    5/2018  Weaver

FOREIGN PATENT DOCUMENTS

WO        2015119592 A1    8/2015

OTHER PUBLICATIONS

International Preliminary Report on Patentability from International Application No. PCT/EP2019/063133, dated Jul. 2, 2020, 18 pages.

* cited by examiner

*Primary Examiner* — Eric A. Rust
(74) *Attorney, Agent, or Firm* — Tucker Ellis LLP

(57) ABSTRACT

The present invention relates to method and system for providing series of serialized unique information on a substrate together with product related information. The method comprising steps of: printing a first product relevant information on the substrate using a first set of printer device (15); storing said first product relevant information a data storage device (20); providing said series of serialized unique information from a source of serialized unique information, using a second set of printer device (30) or marking device on the substrate; storing information about the serialized unique information to a data storage device (20); printing a second set of product related information on the substrate using a printer device (42); and analysing the printed serialized unique information and the first and the second set of product related information on the substrate when formed to a package.

13 Claims, 4 Drawing Sheets

(52) U.S. Cl.
CPC .......... *G06F 3/1256* (2013.01); *G06F 3/1282* (2013.01); *G06K 19/06028* (2013.01); *G06K 19/06037* (2013.01); *G06K 19/0723* (2013.01)

PRINTING PRODUCT INFORMATION ON A SUBSTRATE BASED ON PACKAGE AND SERIAL INFORMATION

TECHNICAL FIELD

The present invention generally relates to applying information on products or items and printing serialized or unique data in particular.

BACKGROUND

In an industrial printing system, an industrial printer is typically configured to print different types of information on various types of information carriers, such as, items, products or articles. One example of an operation of such an industrial printer may be the printing of print information on various types of packages or consumer goods. Commonly, such packages or consumer goods require a great deal of unique or serialized product identifications and content specifications, such as, for example, traceability data, serial numbers, time and dates of packaging, expiry dates, etc.

Moreover, the print information to be printed on the package or consumer goods may vary from one item to the next in a batch of items, from one batch of items to another, from one site of manufacture to another, from one time of manufacture to another, from one type of print technology to another, etc.

Serialized codes may be used for providing a product with unique identity, for example for identification purposes. Some examples of application areas are given below.

The serialized code may be applied as one or several or combinations of barcode symbologies and standards such as GS1, DataMatrix, DotCode, QR-codes.GS1, Codabar, EAN, GTIN, ISBN, UPC, barcodes, or QR-codes. Printing these types of codes sensitive and quality of print can be affected due to, for example print speed. As a serialized code is not static and changes for each new print, the printer must alter data and print new data in high speed with high quality and compliant codes, allowing later scan and read of the code.

The most common technologies used for serialization today may include Thermal Ink Jet (TIJ), Thermal Transfer Overprint (TTO), Continuous Ink Jet (CIJ) and Laser. These print technologies are commonly used for per product coding and marking.

Print & Apply (P&A) and Drop-On-Demand (DOD) are used but limited due to the application. These print technologies are commonly used for marking for case packaging and pallet labelling.

TIJ provides a high quality code, utilizes eco-friendly inks but has as a main disadvantage that the production line speed is limited. Variable printing costs are high. Normally, serialized TIJ applications are within the pharma industry.

CIJ technology could also be used. Unfortunately this technology provides a poor quality code (reading issue). Another issue is the utilization of Methyl ethyl ketone (MEK). Variable printing costs are however low. Last but not least, the production line speed may be limited when printing high quality codes.

TTO printing is only possible when printing on a foil web, e.g. with form, fill and seal applications. It does allow good printing speed (1000 mm per sec). Primary packaging lines can run 10.000 mm/sec or even faster, the TTO is still limited in terms of printing speed. Thus, the main disadvantage is the downtime and ribbons and print heads need to be replaced regularly.

P&A provides a high quality print, but only for secondary, tertiary applications. The printing and labelling speed is very limited and suitable for labels to be applied to a box, bag, pallet, etc.

DOD gives a medium quality print (150 dpi). It has a good (medium) print speed and supplies are eco-friendly. Limited applications are possible (boxes, plastic). Some printers may print max 120 m/min=2000 mm/sec. Consequently, barcode quality at that speed is low and unreliable. To increase the quality one step, the speed may be reduced to 1000 mm/sec. Another downside of this technology is the risk of smudging (preventing QR-codes scanning).

Laser is another method which could be used for serialization. The advantage of Laser is that the line speed can be increased; it is also eco-friendly but has as a main disadvantage that the code quality (e.g. printing an "x" instead of clear dot) decreases and therefore reading the code could become a problem. The laser can produce a full dot, but this is very slow as the "beam" is small so it must sweep the entire area of a barcode element with the beam or produce multiple separate small marks to build up a barcode element. For efficient marking it can produce marking as an X, which is not compliant but is recognized by the scanner. The quality of the code is an important factor due to strict regulations (not compliant). Variable printing costs are low. Print quality goes down, when increasing the line speed.

Applying serialized code may thus encounter with some problems which must be solved:
- Constraint on printing speed versus production line speed for a serialized code;
  - Production line normally require higher speed for final printing of information than it is possible for printing serialized code with high quality.
- Loss of print quality of the serialized code;
  - Depending on, e.g. print speed and printer type the quality of the serialized code may be affected.
- Limitation on printing technology used;
  - certain technologies can only be used for printing, e.g. on products, boxes or pallets;
- Limitation to applications (primary, secondary, tertiary);
- Limitation on packaging materials used;
- Limitation to serialization code type used. Manufacturers prefer QR codes or GS1 codes today as these codes can contain more information and are more common in the market. Manufacturers are only considering alternative serialized code types due to the limitation of print speed and print quality. For example, the "dotcode" is considered applicable for the tobacco industry. On the "dotcode" less information can be stored, but can be printed at a higher speed.

SUMMARY

The present invention offers methods, devices and systems to overcome the above mentioned problems, allows high quality serialization at any production line speed and provides additional advantages described later. The invention according to one aspect provides unique substrate(s) or portion of substrates, which can be used to make for example unique packages (by means of unique serialized code), unique product information carriers, etc.

Shortly, the invention provides for printing packaging material with any analogue printer or press and in a next step print any serialized code on the same packaging material. Both steps may be carried out before production and then print any product data at or after production. Batch data, i.e. serialized data and product data are merged or after production by a computer, e.g. within a database, cloud service or smart contract (e.g. blockchain).

For these reasons, the invention relates to a method of providing series of serialized unique information on a substrate together with product related information. The method comprising the steps of: printing a first product relevant information on the substrate by means of an analogue printer device; storing said first product relevant information in a data storage device; providing a series of serialized unique information from a source of serialized unique information, using a second set of printer device or marking device on the substrate; storing information about the serialized unique information in the data storage device; printing a second set of product related information on the substrate using a printer device; and analysing the printed serialized unique information and the first and the second set of product related information on the substrate to determine content of the substrate when formed to a package. In one embodiment the substrate is used as packaging material, part of a product or in connection with a product. In one embodiment, the result of analysing the printed serialized unique information on substrate and product related information is used for discarding the substrate or its content. The method may comprise transferring and storing information about the serialized unique information and product related information in a data storage device. The method may comprise scanning printed serialized unique information prior to printing the product related information using an image scanning or recording device. The method may comprise scanning printed serialized unique information and the product related information using an image scanning or recording device. In one embodiment the serialized unique information comprises a code that is unique in content and/or appearance for each time the code is generated, wherein each code has a relation to preceding and next code. Preferably, the serialized code is not reprinted. The serialized information batch may be provided by one or several parties depending on data privacy, comprising one or several of government, manufacturer, converter, print service provider, coding manufacturer. In one embodiment, the product related information and the serialized code on the substrate are printed by means of an industrial printer. The serialized unique information may be realized in form of a machine readable/recognizable/detectable code, for example one or several of barcode, 2D codes such as data-matrix, GS1, dotcode, QR-code, character combination, digit combination, images, electrical circuits or RFIDs or combinations thereof. The first set of printer device may be a hybrid printer.

The invention also relates to a system for providing series of serialized unique information on a substrate together with product related information. The system comprises: a first set of printer device, a second set of industrial printer, a data storage device, an image scanning device, and a controller. The system is configured to: print a first product relevant information on the substrate using a first set of printer device; transferring and storing said first product relevant information a data storage device; providing said series of serialized unique information from a source of serialized unique information, using a second set of printer device or marking device on the substrate; transferring and storing information about the serialized unique information to a data storage device and merging data with product related information; printing a second set of product related information on the substrate; and analysing the printed serialized unique information and the first and the second set of product related information on the substrate.

The invention also relates to a controller for providing series of serialized unique information on an information carrier together with product related information. The controller comprising: a processor, a memory, communication interface, configured to communicate with a first set of printer device and a second set of industrial printer, a data storage device, an image scanning device. The controller is further configured to: providing said series of serialized unique information from a source of serialized unique information, using a second set of printer device or marking device on the substrate; transferring and storing information about the serialized unique information to a data storage device and merging data with product related information; printing a second set of product related information on the substrate; and analysing the printed serialized unique information and the first and the second set of product related information on the substrate.

BRIEF DESCRIPTION OF THE DRAWINGS

Reference is made to the attached drawings, wherein elements having the same reference number designation may represent like elements throughout the description.

DETAILED DESCRIPTION

In the following, the term "printing" as used herein, may refer to transferring information onto an information carrier or a media.

The term "industrial printer" as used herein, may refer to a printing or marking device for consumer and industrial goods requiring a great deal of product identification (e.g., expiring dates, traceability data, etc.). The information to be printed may vary from one item to another, from one batch of similar items to another, from one site or time of manufacture to another, and/or from one type of print technology to another. One example of an industrial coding and marking environment may be the printing of labels on various types of packages or consumer goods. Another example may be where multiple coding and marking printers, either of same technology or of different technologies are configured to simultaneously print information on various types of products or items (2 sides of a package, combination of visible and invisible printed information, etc.). Thus, an industrial printer may be a peripheral device which makes a persistent human-readable representation of graphics or text onto a substrate.

The term "serialized code", as used herein, may refer to a code that is unique in content and/or appearance for each time it is generated wherein each code may have a connection with preceding and next code. The serialized code should not be reprinted. The serialized code may be realized in form of a machine readable/recognizable/detectable code, for example one or several of GS1 codes, 1D codes, 2D codes such as DataMatrix, DotCode and QR-code, character combination, digit combination, images, electrical circuits or RFIDs.

The term "static code" or "static information" as used herein, may refer to any type of recurrent or repeating data/information, which is substantially the same from one print to another. The static code/information may comprise product data/information, content, manufacturing date, best before date, etc.

The general idea of the invention is to print packaging material with any analogue printer or press and in a next step, and print any serialized code on the same packaging material. Both steps are may be carried out before production. Then print any product data at or after production. Batch data, i.e. serialized data and product data are merged or after production within a database, cloud or smart contract (e.g. blockchain).

Thus, a digital file comprising the serialized code and product related data may be divided in two or more digital files before production, merged after pre-printing the packaging and merged at or after production.

Figure 1:
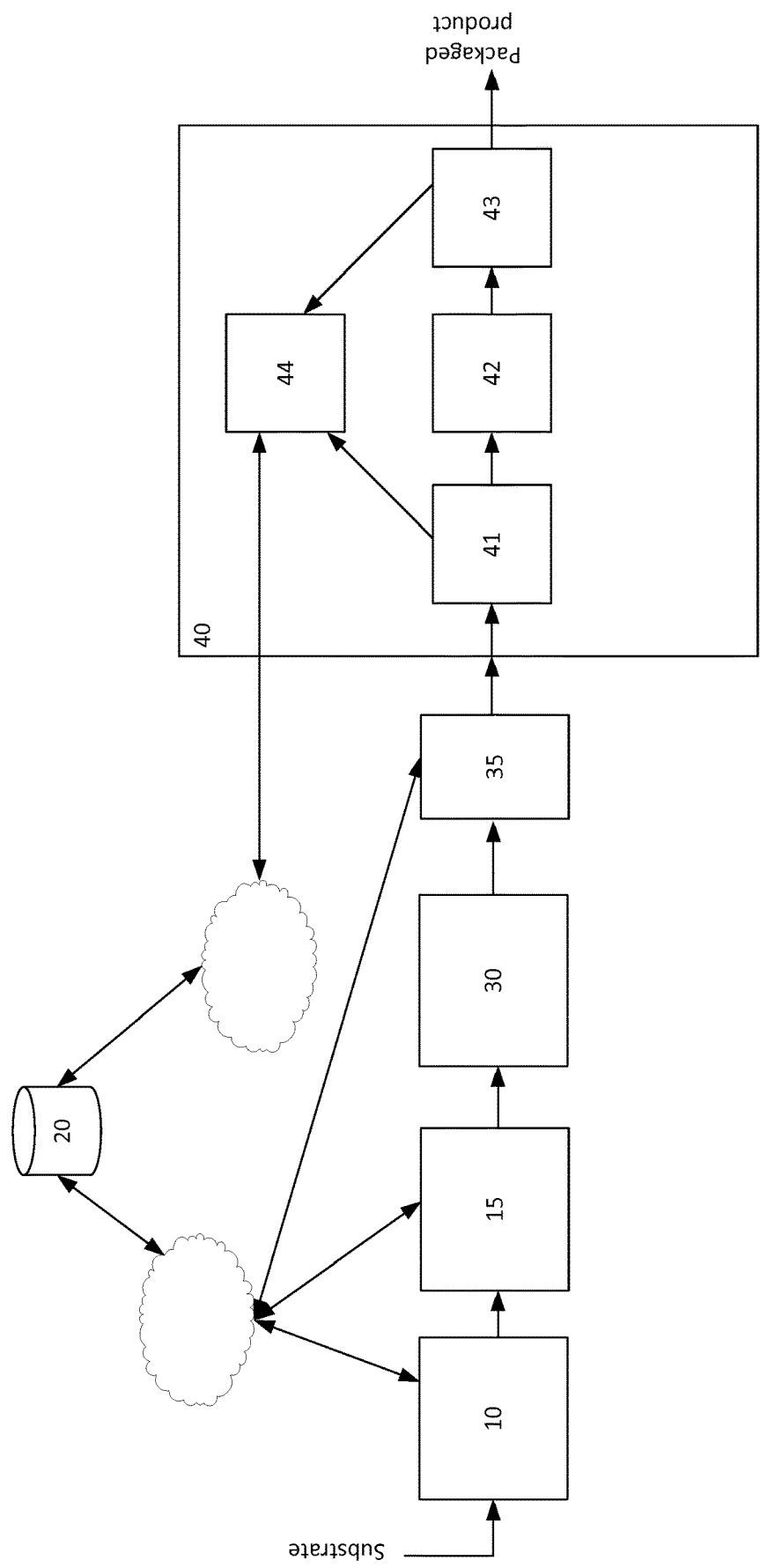
FIG. 1 is a diagram of an exemplary system in which methods and device described herein may be implemented.

According to one exemplary embodiment as illustrated schematically in FIG. 1:

1. The product manufacturer 40 purchases packaging material from a provider 10. The provider may be a packaging solution company able to print the packaging material. The packaging material is given as an example and may be any type of substrate for carrying information about a product.
2. The provider 10 prints using printer 15 (package related info such as appearance) the requested packaging material and stores the batch product data related to packaging, e.g. in a database, cloud or smart contract (e.g. blockchain) 20.
3. A unique code package is generated and registered in a database or cloud 20.
4. A marking and/or coding printer 30 pre-prints the unique codes without product data (e.g. lotnumber, best before date) on the same packaging material, which makes each package unique. The individual packages may be part of a roll, plate etc. The marking and/or coding printer may also comprise a hybrid printer, i.e. a printer comprising both digital and analogue printing abilities.
5. A scanner and/or vision camera 35 scans the unique code (e.g. QR code, dotcode) after pre-printing.
6. The disparate sets of data (batch data and unique code package) are merged (e.g. vertical look-up) and stored.
7. The packaging materials are shipped to the product manufacturer 40. At factory/production each unique code is scanned with a scanner 41 and/or a vision camera. The unique code may then be related to product data by the controller 44. If the related data (serialized code and product data) matches certain requirements specific for the product and package, the packaging is filled and if the related data does not meet the requirements, the packaging will be rejected. However, as applications are dynamic, printing can happen before or after filling. Both cases are may occur.
8. An industrial printer(s) 42 may be used to print a product data on a pre-defined location on the unique packaging. The product data may comprise for example a lot number, best before date, serialized data, content information, manufacturing data, etc.
9. After printing, a scanner 43 and/or vision camera (or any other image acquiring device) scans the unique code and product data.
10. The result of scanned information is provided to the controller 44. The disparate sets of data are merged (e.g. vertical look-up) or associated and may be stored in the database 20, cloud service or a digital information (code) distribution system, such as blockchain.

At any step of the value chain (distribution network)—manufacturer, wholesaler, distributor, retailer, customer—can effectively scan the unique code to obtain information and use for a variety of purposes.

The unique code package, as mentioned above, can be provided by several parties depending on data privacy, e.g. government, manufacturer, converter, print service provider, coding manufacturer or any other third party. Series of unique codes may be purchased from service providers.

The invention can use any data storage as database 20 or so called cloud service, distributed smart contract or distributed database (e.g. blockchain).

Scanning must be carried out at or after printing product data. Scanning before printing of product data is an optional step.

Figure 2:
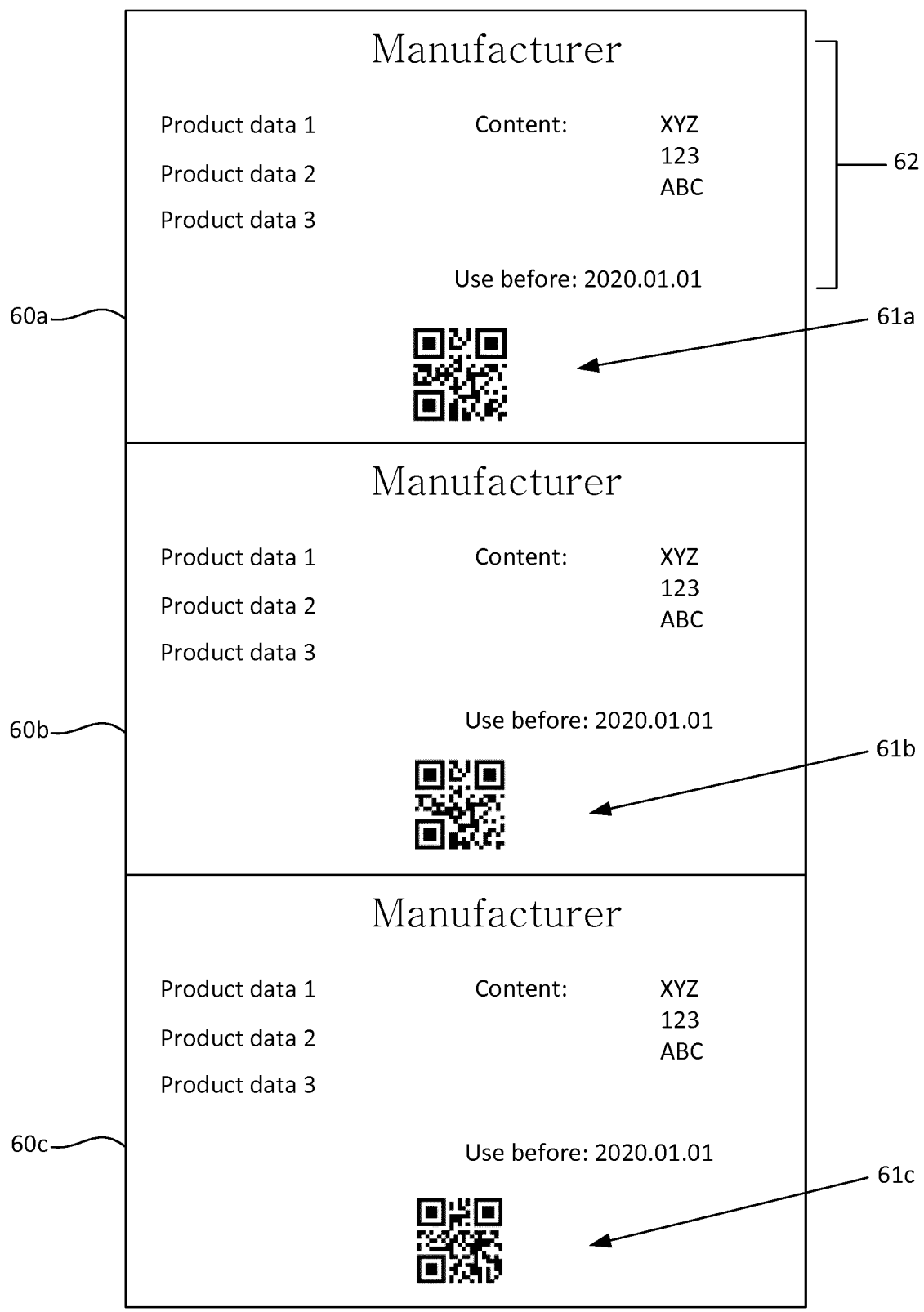
FIG. 2 illustrates a schematic view of label portions printed in accordance with teachings of the present invention.

FIG. 2 illustrates exemplary embodiments of label parts 60a-60c of, e.g. a package comprising serialized portions 61a-61c and static portions 62. The serialized portions 61a-61c are preprinted, when the package material is printed using an analogue printer and each comprises a unique serial code, in this case a QR-code. The static portions 62 are printed during production (packaging) and comprise product data same for all products. It is clear that the static portion may also have variable data but not as sensitive as the serialized portion. The static data may also be printed elsewhere on the package. It is also evident that the QR-code, e.g. due to size, requires high print quality (e.g. especially for scanning), which may be an obstacle during high speed printing.

In yet another application of the invention a serialized code (e.g. QR code, dot-code) is printed on any material or product before production and a product data (e.g. lot number, best before date, date) is printed at or after production. The serialized code and product data are merged at or after production within a database or so called cloud storage. In the packaging facility each package is filled with a unique content, e.g. different number of units, content with different colours, different shape, different weight, different taste, different smell, etc., and the unique content is associated with the unique data stored in the database or cloud.

Figure 4:
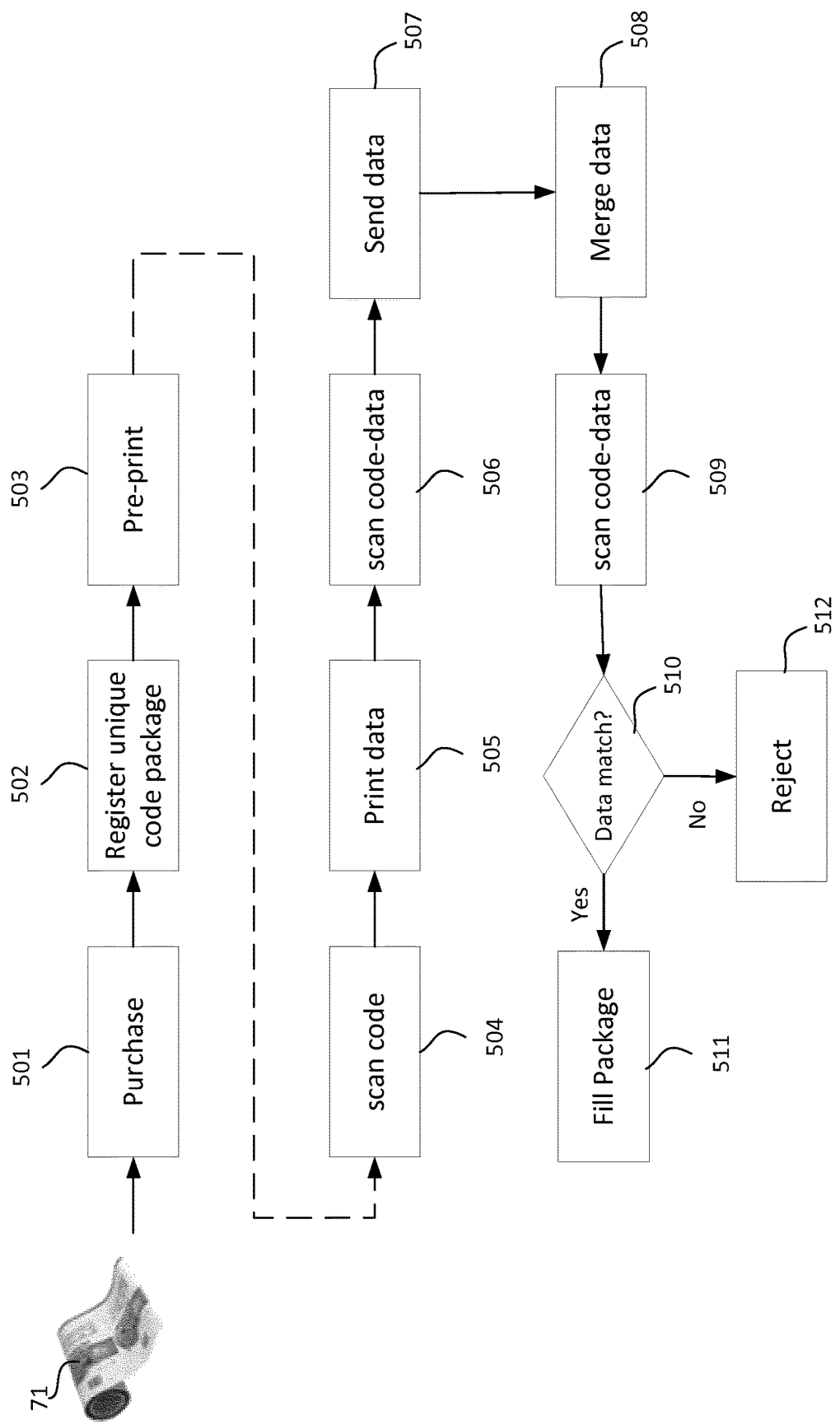
FIG. 4 is a diagram of an exemplary embodiment of process steps used in the system of FIG. 1.

With reference to the flow diagram of FIG. 4:

1. A manufacturer purchases 501 packaging material 71 from a converter, print service provider or any other third party with an analogue printer;
2. A unique code package is registered 502 in a database, cloud storage or distributed database (e.g. blockchain);
3. A marking and/or coding printer pre-prints 503 the unique codes on the packaging material to make each package unique (e.g. on film role or on packaging sheet or a substrate). The individual packages may be part of a roll, plate, etc. The marking and/or coding printer may also comprise a hybrid printer, i.e. a printer comprising both digital and analogue printing ability;
4. At factory/manufacturing site, each unique code is scanned 504 with a scanner and/or vision camera.
5. A product data (e.g. lot number, best before date, unique content, serialized data) is printed 505 on a pre-defined location on the unique packaging.
6. A scanner and/or vision camera scans 506 after printing the unique code and product data.
7. All information is transmitted 507 to the manufacturer's preferred print controller system (e.g. MES, Middleware, CoLOS). The disparate sets of data are merged (e.g. combined, linked, related, etc.) 507 and stored in the database or cloud storage.

8. At factory/manufacturing site, each unique code is scanned 508 again with a scanner and/or vision camera. Of course, other codes/product information can optionally be read and checked for quality checking purpose, for example.
9. Production:
   if 510 the merged data matches the requirements (e.g. correct relation between the sterilized data and product information, right package and product to be packaged, etc.), the packaging will be filled 511 with a unique content (e.g. different number of units, different colours, different shape, different weight, different quality, different taste, different smell); and
   if the merged data does not meet the requirements, the packaging will be rejected 512.

At any step of the value chain (distribution network)—the manufacturer, wholesaler, distributor, retailer, customer—can effectively scan the unique code to obtain information and use for a variety of purposes.

Abovementioned requirements may comprise the product manufacturer defined criteria's, e.g. that the readability of the codes meet a defined criteria, that it is the right pack before filling, etc. Normally, it is expensive to fill a pack and then have to re-work it if something is wrong, so the invention provides for a safe check before filling. Moreover, this allows ability to: produce unique packaging material with unique codes and unique content (digital production); and to match supply and demand (personalized production).

Figure 3:
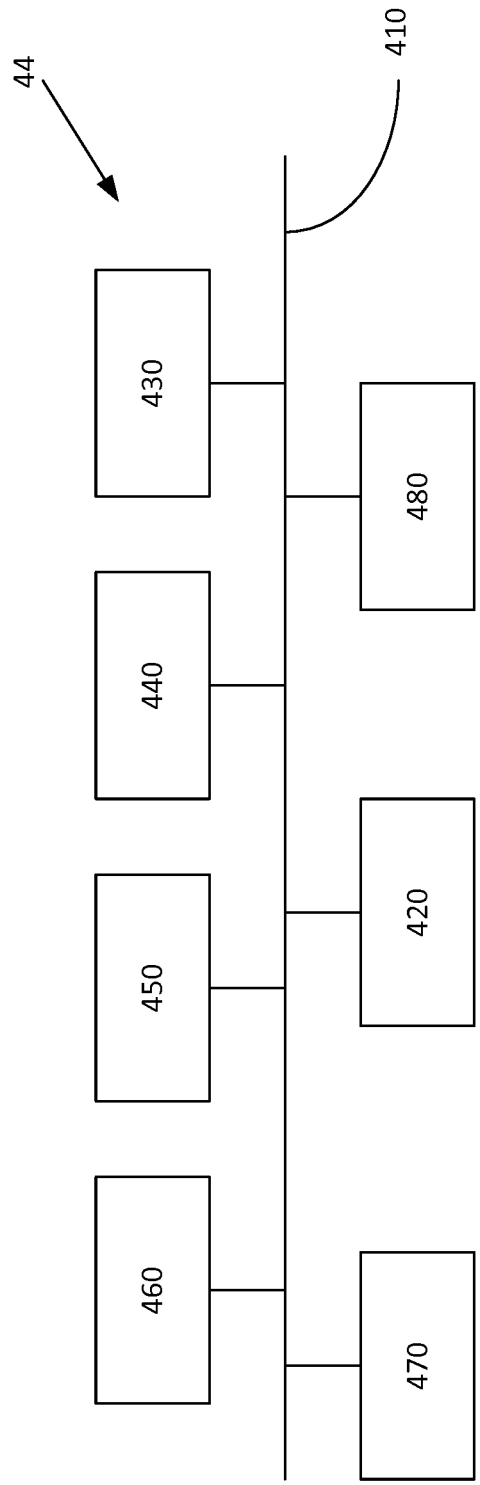
FIG. 3 is a diagram of an exemplary processing system used in the system of FIG. 1.

FIG. 3 is a diagram of an exemplary system 44 in which methods and systems described herein may be implemented. The system 44 may include a bus 410, a processor 420, a memory 430, a read only memory (ROM) 440, a storage device 450, an input device 460, an output device 470, and a communication interface 480. Bus 410 permits communication among the components of system 44. The system 44 may also include one or more power supplies (not shown). One skilled in the art would recognize that system 44 may be configured in a number of other ways and may include other or different elements.

Processor 420 may include any type of processor or microprocessor that interprets and executes instructions. Processor 420 may also include logic that is able to decode media files, such as audio files, video files, multimedia files, image files, video games, etc., and generate output to, for example a display, etc. Memory 430 may include a random access memory (RAM) or another dynamic storage device that stores information and instructions for execution by processor 420. Memory 430 may also be used to store temporary variables or other intermediate information during execution of instructions by processor 420.

ROM 440 may include a conventional ROM device and/or another static storage device that stores static information and instructions for processor 420. Storage device 450 may include a magnetic disk or optical disk and its corresponding drive and/or some other type of magnetic or optical recording medium and its corresponding drive for storing information and instructions. Storage device 450 may also include a flash memory (e.g., an electrically erasable programmable read only memory (EEPROM)) device for storing information and instructions.

Input device 460 may include one or more conventional mechanisms that permit a user to input information to the system 44, such as a keyboard, a keypad, a directional pad, a mouse, a pen, voice recognition, a touch-screen and/or biometric mechanisms, etc. Output device 470 may include one or more conventional mechanisms that output information to the user, including a display, a printer, one or more speakers, etc.

Communication interface 480 may include any transceiver-like mechanism that enables system 44 to communicate with other devices and/or systems. For example, communication interface 480 may include a modem or an Ethernet interface to a LAN. Alternatively, or additionally, communication interface 480 may include other mechanisms for communicating via a network, such as a wireless network. For example, communication interface may include a radio frequency (RF) transmitter and receiver and one or more antennas for transmitting and receiving RF data.

The system may be configured to communicate with the database/cloud 20 through communication interface 480. The processor 420 is further configured to receive information from the scanners/vision cameras 41 and 43 and process the information, e.g. comparing product data with the serialized information, etc. The system 44 may also control the printers and production line.

According to one exemplary implementation, system 44 may perform various processes in response to processor 420 executing sequences of instructions contained in memory 430. Such instructions may be read into memory 430 from another computer-readable medium, such as storage device 450, or from a separate device via communication interface 480. It should be understood that a computer-readable medium may include one or more memory devices or carrier waves. Execution of the sequences of instructions contained in memory 430 causes processor 420 to perform the described acts. In alternative embodiments, hard-wired circuitry may be used in place of or in combination with software instructions to implement aspects consistent with the invention. Thus, the invention is not limited to any specific combination of hardware circuitry and software.

The present invention provides advantages and benefits compared to other printing methods. Some examples of the application areas include:

Health: Governments under pressure are seeking ways to maximize tax revenues to enforce existing regulations on excise products. They are increasingly aware of the use of product marking both for excise products and for other industries, which increases the likelihood and speed of implementation of marking proposals for alcohol, tobacco or any other health-risk industry (candy). The industry is looking at implementing nonproprietary product marking technologies, the adoption of global supply chain standards, in order to demonstrate supply chain transparency, and increased control on the value chain. With the invention we make each packaging unique which opens the door to fiscal coding (duty stamps).

Safety: in past years, there have been major problems inside the food industry. With the invention any product can be made unique with unique package.

Environment: Governments are pushing vendors and manufacturers to take ownership in reducing plastic waste. With the invention the industries can stimulate consumers to return the packaging (loyalty program).

Track & Trace: with GS1 or other regulatory or customer compliance it is possible to track and trace secondary and tertiary applications. Implementing the invention allows tracking and tracing the primary space as well.

Stock & Return Processes: Presently, when returning products to a store, the retailer has a complicated mix of return processes (RMA) which is an administrative burden for them. Using the invention, the RMA process may be simplified and standardized and greater control over inventory (e.g. clothing industry) may be achieved.

Supermarkets/food-markets: Presently, supermarkets or food markets know the number of products they have on the shelf. However, they don't know how many they still have on the shelf and with which expiry date. Using the invention, markets may attract customers to the store in discounting products who are about to expire (loyalty). Supported also by brands' owners, food gain may be reduced, resulting in better waste control and enhancing environment.

Pay-Per-Print: Presently, not all manufacturers are capable in providing a pay-per-print/pack concept. Having a unique code concept opens the door for vendors to initiate pay per print ability.

Recall Management: recalling a production batch is a difficult task. The invention, allows for end-to-end traceability of all produced products.

Detect/Read/Remove: Normally, entire production lines are often stopped when detecting a "bad packaging". Using the invention, a bad object/package may be rejected at any time during the packaging line process. For example metal detector detects metal inside a product, after detection product is rejected, line keeps on running. Consequently, uptime at factories is more secured.

Anti-counterfeit: anti-counterfeiting measures are increasingly important for products with a reasonable value, such as cosmetics, spare parts, etc. Serialization options may become costly or even not possible for these markets. Using the invention, unique codes can be pre-printed, checking against counterfeit.

Restaurants: Restaurants may suffer from waste problem as they don't have their "fresh food" stock under control. The present invention may help them better managing this problem. For example: food chain restaurant in one country has problem with "stock management". For a number of restaurants there is a need of staff for checking what to order, which normally is done all manually. There is a need for a system, which allows to automatically replenishes their stock when something is taken out of, e.g. their cooling systems.

Distribution centers: Distributors ship full boxes of one and the same item towards supermarkets. Using the invention, "pick and pack" can be done at product level instead of at case level. This could help supermarkets reduce stock levels.

Discounters: with the new invention it is possible for discounters to create "ready to sell cases".

Blockchain: Using the present invention, it may be possible to connect the unique coding towards the blockchain. The unique coding may become an enabler for the blockchain or for example an electronic smart contract and allows for where, when, how it is packaged and manufactured. This can trigger multiple solutions such as: "automatic payments", customers being able to specify the origin of their product in the package (e.g. coffee beans from Thailand instead of Colombia). Thus, digital information (codes) may be distributed but not copied.

Consequently, the present invention provides a number of advantages over the prior technologies, such as:

No disruption of existing infrastructure at customer/factory as the preprinting will be applied prior to online printing;

High Return of Investment for manufacturer/packaging industry due to limited investment and reduced costs;

Suitability for all existing coding technologies;

Suitable for all applications (primary, secondary, tertiary);

Combination of an analogue printer with a marking and coding printer provides similar benefits as if using a "digital printer", but is more cost friendly, especially for large batches (e.g. today's 97% of packaging market);

Allows for printing all serialized coding types (e.g. brands prefer QR code today as this code can contain more information and is more common. Brands considering a dotcode due to existing limitations of print speed);

The analogue printers also allow for no limitations in printing materials;

No change to any infrastructure setup. Customers can keep on working with vendors (packaging solution providers). No disruption of existing infrastructure at customer/factory. Customers can keep on working with several vendors;

Suitable for all packaging materials due to presence of analogue printing. The substrate or material may comprise any type of material, such as: carton, films, cotton, metal, etc.;

Printing speed is no longer an issue as serialized code is pre-printed; and

Printing quality is no longer an issue as the marking and coding printer is pre-printing at high quality.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

Software and web implementations of various embodiments of the present invention can be accomplished with standard programming techniques with rule-based logic and other logic to accomplish various database searching steps or processes, correlation steps or processes, comparison steps or processes and decision steps or processes.

The various embodiments of the present invention described herein is described in the general context of method steps or processes, which may be implemented, entirely or partly, in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method of providing product related information and a series of serialized unique information on an individual substrate in a series of substrates, the method comprising:
   printing a package related information on the series of substrates by means of an analogue printer device;
   storing the package related information in a data storage device;
   generating by a processing unit the serialized unique information and storing in a database, the serialized unique information comprising a code, which is unique in content and/or appearance for each time it is printed;
   printing the serialized unique information from the database of the serialized unique information, using a first printer device or marking device on each individual substrate;
   recording by a recording arrangement and storing information about the serialized unique information in the data storage device;
   electrically merging the serialized unique information and the package related information;
   scanning by a scanning device the serialized unique information on each individual substrate and associating by the processing unit the serialized unique information with the package related information and comparing by the processing unit associated data with requirements specific for the packaged product and the corresponding package; and
   printing a set of product related data on each individual substrate using a printer device with respect to the result of comparison of requirements specific for the packaged product and the corresponding package.

2. The method of claim 1, wherein the individual substrate is used as packaging material, part of a product or in connection with a product.

3. The method of claim 1, wherein the result of the comparison of the printed serialized unique information on the individual substrate and the product related information is used for discarding the individual substrate or its content.

4. The method of claim 1, further comprising scanning the printed serialized unique information prior to printing the product related information using an image scanning or recording device.

5. The method of claim 1, further comprising scanning printed the serialized unique information and the set of the product data information using an image scanning or recording device.

6. The method of claim 1, wherein each code has a relation to preceding and next code in a series of codes.

7. The method of claim 6, wherein the code is not re-printable.

8. The method of claim 1, further comprising providing a serialized unique information batch by one or several parties depending on data privacy, and the one or several parties comprises government, manufacturer, converter, print service provider, or coding manufacturer.

9. The method of claim 1, further comprising printing the product related data and the code on the individual substrate by means of an industrial printer.

10. The method of claim 1, wherein the serialized unique information is realized in form of one or several of a machine readable, recognizable or detectable code, being one or several of barcode symbology and GS1, DataMatrix, dotcode, QR-codes.GS1, Codabar, EAN, GTIN, ISBN, UPC, barcodes, character combination, digit combination, images, electrical circuits or RFIDs or combinations thereof.

11. The method of claim 1, wherein the first printer device is a hybrid printer.

12. A system for providing a series of serialized unique information and product related information on an individual substrate in a series of substrates, the system comprising:
   an analogue printer device;
   a first printer device;
   a data storage device;
   an image scanning device, and
   a controller configured to generate instructions to:
   the analogue printer device to print a package related information on the series of substrates;
   store said package related information in a data storage device;
   a second printer device or a marking device to print the serialized unique information from the data storage of the serialized unique information, on each individual substrate, wherein the serialized unique information comprises a code, which is unique in content and/or appearance for each time it is printed;
   record and store information about the serialized unique information in a data storage device
   electrically merge the serialized unique information and the package related information;
   scan, by the image scanning device, the serialized unique information on the individual substrate and associating the serialized unique information to package related information and compare associated data with requirements specific for a product and a package; and
   print a set of product related data on each individual substrate with respect to the comparison of requirements specific for the product and the package.

13. A controller for providing a series of serialized unique information and a product related information on an individual information carrier, the controller comprising:
   a processor,
   a memory,
   a communication interface, configured to communicate with an analogue printer device and a first printer, a data storage device, and an image scanning device,
   wherein the controller is further configured to generate instructions to:
   the analogue printer device to print a first information carrier related information on the individual information carrier;
   transmit the series of serialized unique information to the first printer device or marking device to print the serialized unique information on the individual information carrier, wherein the serialized unique information comprises a code, which is unique in content and/or appearance for each time it is printed;
   record and store information about the serialized unique information in the data storage device;
   merge the serialized unique information and information carrier related information in a memory;
   scan by an image scanning device the serialized unique information on the individual information carrier and associating the serialized unique information to information carrier related information and comparing associated data with requirements specific for the product and the package; and
   print a set of product related data on the individual information carrier with respect to a result of the comparison of requirements specific for the product and the individual information carrier.

* * * * *